(No Model.)
E. W. ROBINSON, C. H. O'BRIEN & H. M. BREEN.
ELECTRIC EXERCISING MACHINE.
No. 375,835. Patented Jan. 3, 1888.
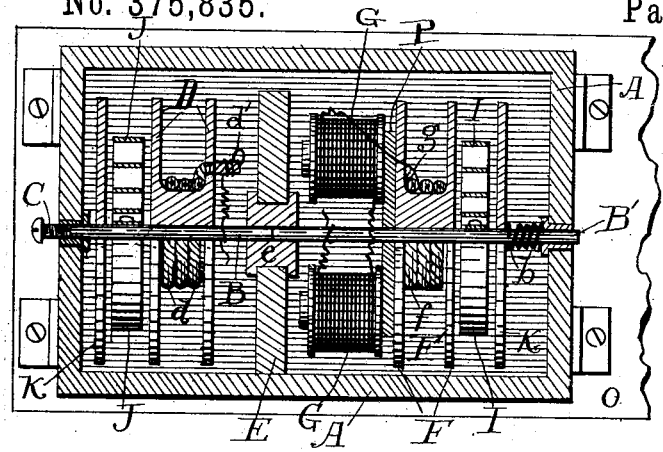
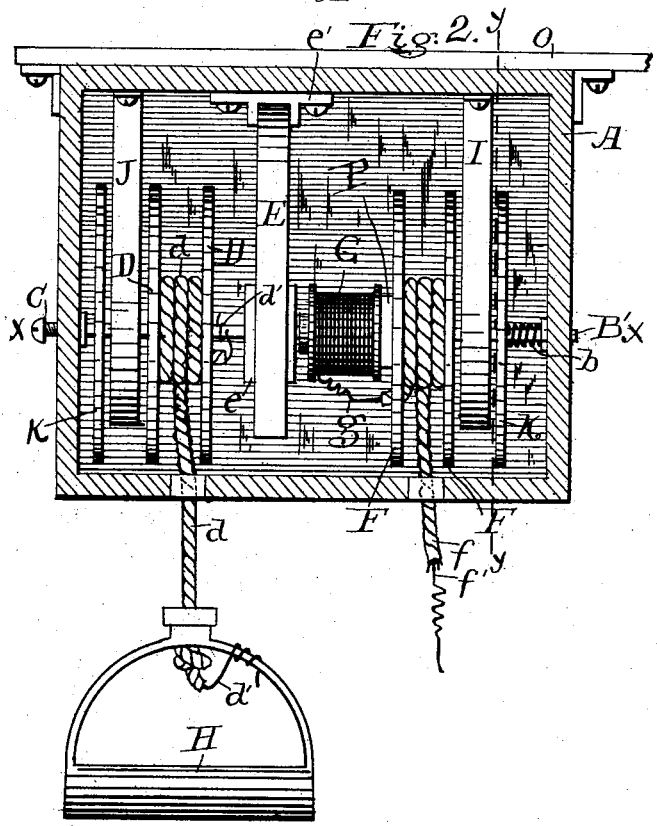
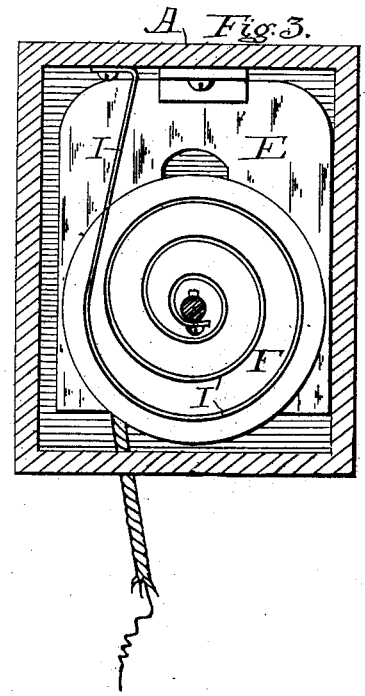
Witnesses:
Wilbur F. Lunt.
Elmer E. Rideout.
Inventors:
Edward W. Robinson
Charles H. O'Brien
Howard M. Breen
by S. W. Bates
Their atty.

UNITED STATES PATENT OFFICE.

EDWARD W. ROBINSON, CHARLES H. O'BRIEN, AND HOWARD M. BREEN, OF PORTLAND, MAINE.

ELECTRIC EXERCISING-MACHINE.

SPECIFICATION forming part of Letters Patent No. 375,835, dated January 3, 1888.

Application filed April 1, 1887. Serial No. 233,280. (No model.)

*To all whom it may concern:*

Be it known that we, EDWARD W. ROBINSON, CHARLES H. O'BRIEN, and HOWARD M. BREEN, citizens of the United States, residing at Portland, in the county of Cumberland and State of Maine, have invented certain new and useful Improvements in Electric Exercising-Machines; and we do hereby declare the following to be a full, clear, and exact description of the invention, such as will enable others skilled in the art to which it appertains to make and use the same.

Our invention relates to devices for generating electricity for medical or hygienic purposes; and it consists of a magneto-electric machine or Faradic generator of suitable size, arranged in connection with a hygienic pulling apparatus in such a manner that the pull of the cords rotates the armature or the moving part of the generator, thereby producing an electric current which is conducted, by suitable connecting wires, through the body of the operator.

Our invention further consists of certain combinations of parts which enter into the construction of our device and which will be more particularly pointed out in the claims.

Pulley-weights and other devices have hitherto been made and used for exercising the muscles of the arms, legs, and other parts of the body, and magneto electric machines and batteries of various kinds have been used for passing currents of electricity through the body.

Our invention has for its object the construction of an apparatus which may be used as an exercising-machine for the arms or for any part of the body, and in which a current of electricity may be developed by the force used to operate the machine and conveyed by suitable connections through the body of the operator.

With this end in view we provide, as one form in which our invention may be applied, a small magneto-electric machine with the usual permanent magnet and armature rotating near its face and having a central shaft or spindle, a reel connected with said shaft or spindle, a cord wound thereon, the cord having a conducting-wire contained in or forming part thereof and connected with a metallic handle, and a spring for turning the shaft and winding up the cord after it has been pulled out and unwound. There is also an auxiliary shaft abutting the main shaft and having a second reel, cord, and spring and an adjusting screw and spring, whereby the distance of the armature from the permanent magnet is regulated. This device we illustrate in the accompanying drawings, in which—

Figure 1 is a part section through X X of Fig. 2. Fig. 2 is a plan or top view, with top of box cut away. Fig. 3 is a section through Y Y of Fig. 2.

A represents a box for holding the parts of our device, and when used to exercise the arms the box is secured to the wall at about the height of the chest. A permanent magnet, E, is secured to the inside of the box, and between the two poles of the magnet is the bearing e. In this bearing rests one end of the spindle B', the other end of which rests in a bearing connected with the end of the containing-box. On this spindle B' is the yoke P, on each end of which is a bobbin, G. The spindle also contains the reel F, having wound thereon the cord f, which passes through the face of the box and is secured to the metal handle H. Running through the length of the cord f is the conducting-wire f', which is joined to one end of the wire with which the bobbins are wound, the opposite end of said wire being connected with the central spindle, B'. The coiled spring I is secured by one end to the box, and by the other end to the spindle in such a manner that when the cord f is drawn out the spring is coiled up. An auxiliary shaft or spindle, B, abuts against the end of spindle B', within the bearing e, and against its outer end the screw C is made to impinge. On the auxiliary spindle B is a second reel, D, having a cord, d, also connecting with a metal handle and having a connecting-wire, d', which is connected with spindle B. A spring, J, is also attached to the box and to spindle B.

K K are flanges to keep the springs J and I in place.

A spiral spring, b, is placed on the spindle B', and presses toward the permanent magnet and against the screw C.

The operation of our device is as follows, viz: The handles H are grasped by the hands and pulled out either together or alternately. As the cord $f$ is drawn out the bobbins G G are rotated in front of the permanent magnet E, and a current of electricity passes through the wire $f'$, and thence through the handle H and the body of the operator and back by the wire $d'$, to the spindle B, and along said spindle to the bobbins G G, thus completing the circuit. When either of the handles H are released, the recoil of the springs J or I winds up the corresponding cord on its reel. It will thus be seen that the operator, while exercising the muscles of the arms or other parts of the body, generates at the same time an electric current, which augments to a very great extent the beneficial effects of the muscular exercise.

The combination of exercise and electricity is found to be very beneficial to the health. The strength of the current may be varied or graduated by the adjusting-screw C. As the screw is moved in and out, the armature is made to approach and recede from the permanent magnet, thus increasing or diminishing the amount of current produced, which varies as the square of the distance between the armature and the permanent magnet. The strength of the current is also dependent on the rapidity of the motion, so that the operator always has a ready means of checking or increasing the electric current by simply changing the speed of the pull.

It may be desired to make the current traverse the whole length of the body, in which case a metal plate would be provided for the operator to stand on, and one of the wires of the circuit may be connected therewith. The current will thus pass through one or both of the arms, and thence out at the bottoms of the feet.

In place of the springs I and J weights or other equivalent devices may be used, or the generator may be attached to the rotating spindles of chest-weights such as are now in common use. This device can be applied equally well to pulling, rowing-machines, bicycles for home training, and other exercising-machines which have a rotating spindle or arbor.

We claim—

1. In an exercising machine, a shaft having thereon a reel, a pulling-cord on said reel, and a resisting-spring therefor, and a magneto-electric mechanism, the armature of which is secured to said shaft and rotates with it, combined with suitable connections whereby the electricity generated by the pulling of said cord is conveyed to the body of the operator, substantially as described.

2. In an exercising-machine, the combination of a shaft having thereon a reel, a pulling-cord on said reel and a resisting-spring therefor, a magneto-electric mechanism the armature of which is secured to said shaft and rotates with it, a second reel secured to an independent shaft, a pulling-cord thereon, and a resisting-spring therefor, and suitable connections for conveying the electricity to the body of the operator, substantially as shown.

3. In an exercising-machine, the combination of a shaft having thereon a reel, a pulling-cord on said reel and a resisting spring therefor, a magneto-electric mechanism the armature of which is connected with said shaft and revolves with it, suitable connections whereby the electricity is carried to the body of the operator, an independent shaft, one end of which is in contact with the other shaft, and a reel on said independent shaft, a pulling-cord on said reel, and a resisting-spring therefor, substantially as shown.

In testimony whereof we affix our signatures in presence of two witnesses.

EDWARD W. ROBINSON.
    CHARLES H. O'BRIEN.
    HOWARD M. BREEN.

Witnesses:
  S. W. BATES,
  WILBUR F. LUNT.